United States Patent [19]
Faber

[11] 3,930,050
[45] Dec. 30, 1975

[54] PROCESS FOR PREPARING LOW CALORIE GELATIN DESSERT WITH BROMELAIN

[76] Inventor: Berry V. Faber, 34 Yukon St., San Francisco, Calif. 94114

[22] Filed: Aug. 6, 1973

[21] Appl. No.: 386,125

[52] U.S. Cl. .................. 426/564; 426/576; 426/804
[51] Int. Cl.² ............................................. A23L 1/04
[58] Field of Search ............ 426/168, 169, 170, 32, 426/564, 576, 804

[56] References Cited
UNITED STATES PATENTS
2,838,402   6/1958   Steigmann .......................... 426/168

Primary Examiner—Jeanette M. Hunter
Attorney, Agent, or Firm—Townsend and Townsend

[57] ABSTRACT

Novel low calorie gelatin desserts and gelatin based puddings which contain small amounts of bromelain and/or papain to provide a smooth texture and yield desserts which do not harden, become rubbery, or crack when stored over extended periods of time.

4 Claims, No Drawings

PROCESS FOR PREPARING LOW CALORIE GELATIN DESSERT WITH BROMELAIN

This is a substitute for my abandoned application Ser. No. 84,234, filed Oct. 26, 1970.

This invention relates to low calorie pudding desserts. More particularly, this invention is directed to low calorie gelatin based pudding desserts containing a small amount of bromelain and/or papain.

Commercially available pudding compositions generally employ starch as the thickening agent. The use of starch, while producing a pudding of desirable consistency, contributes to the caloric content of the final pudding product. Starch has also been added to instant pudding mixes which employ the combination of milk and a coagulating enzyme as the pudding thickening agents. While increasing the consistency of these instant puddings, the starch also increases their caloric content.

In accord with this invention, a starch free, unflavored gelatin based low calorie pudding is provided having incorporated therein a small amount of a hardening retardent selected from the group consisting of bromelain and papain. The gelatin serves as the thickening agent and the hardening retardent serves as a softener for the gel.

Caloric content of the pudding is significantly reduced by using gelatin rather than starch as the thickening agent. As the gelatin, a protein substance, contains virtually no calories, the final product provides protein and not carbohydrate nutrients.

In order to provide a gel having sufficient consistency for use in puddings, relatively large amounts of gelatin are required. The bromelain and papain substantially retard gelatin hardening and the attendant increase in inedible qualities that would otherwise occur. Without the addition of the hardening retardent, the gel would become rubbery, glassy, stiff, watery or cracked upon storage under normal refrigeration conditions.

In the puddings of this invention, the gelatin is dissolved in a measured amount of water or other suitable liquid such as milk. It is preferred to combine about 9 to 15 grams of gelatin with approximately 2 cups (about 474 grams) of the liquid. This is as much as double the standard amount of 7 grams usually employed in gelatin desserts. The additional gelatin increases the body of the final gel, affording a texture suitable for puddings.

Bromelain, a protein-digesting, milk-clotting enzyme found in pineapples has not previously been used in gelatin base desserts. Bromelain is known to prevent gelatins from gelling. Cooking instructions accompanying packaged gelatin desserts include warnings against adding fresh pineapple to the gelatin. If fresh pineapple is used, the dessert will not set. It was therefore surprising to find in the present invention that bromelain can be used with gelatin to yield a fine, smooth consistency dessert and also to prevent cracking and hardening of the dessert.

The bromelain may be added to the gelatin either before or after the addition of the water. The amount of bromelain added will be dependent, among other things, upon the type of pudding being prepared. For fruit fillings incorporating pineapple, lesser amounts of bromelain will be sufficient. Other fruit containing fillings or cocoa puddings will require greater amounts. It has been found that best results are obtained when 1.5 to 5.0 milligrams of bromelain are added to the gelatin per gram of gelatin. If desired, these amounts can be increased as much as 50 percent to achieve a softer pudding. Initial gelling time will be increased accordingly.

Since bromelain is a highly active agent and only small amounts are required, it is preferred that it be combined with a filler such as lactose. Any other common filler or carrier may be substituted for the lactose, provided the bromelain can be uniformly distributed therethrough. A suitable amount of the bromelain mixture is added to the pudding mix to provide the desired bromelain to gelatin ratio. The proportions of bromelain and lactose may be varied, so long as the preferred bromelain-gelatin ratio is maintained.

It has also been found that papain, a protein-splitting enzyme obtained from the juice of unripe papaya, is effective in retarding gel hardening. In this respect it can be used much in the manner as bromelain and can be added to gelatin either alone or in admixture with bromelain. If added alone, about 4 to 5 times as much papain (about 6.0 to 25.0 mgs/g gelatin) will be required due to its lower activity. The exact amounts to be employed in the gelatin dessert will generally be a function of the same variants as in the case of bromelain. Also, as with bromelain, the papain may be mixed with a filler.

The puddings of this invention are prepared without cooking. A dry powder pudding mix including gelatin and flavorings is first formulated and blended. A measured amount of cold water is then added to the mix to soften the gelatin. Thereafter, sufficient boiling water is added to dissolve the gelatin and other ingredients. The solution is then allowed to cool and set, i.e. harden, for a limited time to form a gel. Usually, sufficient set is achieved by cooling the solution in a refrigerator for two to three hours at normal refrigeration temperatures. The thus formed gel is subject to a final beating or whipping step to make it creamy throughout. The resulting whipped gel has the consistency of pudding and may be served immediately, or rechilled to be used at a later time.

Whether or not the bromelain or papain is added either directly to the dry pudding mix, or to the pudding during the final beating step is dependent, among other things, upon the particular pudding being prepared. With certain puddings, taste or texture may not be optimal if the bromelain or papain is initially blended with the dry pudding mix. Hence, it may be preferable to add the bromelain or papain separately during the final preparation step.

Dry pudding and pie filling preparations of the lemon, coffee, chocolate, vanilla and fruit varieties according to this invention will generally contain the following amounts of basic ingredients (for a serving for 4):

Gelatin: 4–6 teaspoons (one teaspoon 2.5 grams)
Bromelain: 15–75 milligrams
sweetener: ¼– ½cup sugar or its equivalent
Fruit: ½– 1 cup
Whole dry egg (with vanilla puddings)
Whole dry milk or a substitute therefore
Flavoring and spices Variations in ingredients for the puddings may be made, with the exception that the bromelain-gelatin ratio must remain the same. Instant non-fat dry milk powder and dry fat solids such as non-dairy creamers may be combined as a substitute for the whole dry milk if production, freshness or economy factors warrant. If such a substitution is made, the fat content should approximate that contained in whole dry milk so that the total caloric content of the pudding is not increased. If papain is used instead of bromelain, about 60–375 milligrams would be added to the above formulation.

Pre-softened gelatins or specially treated gelatins can be employed in the pudding compositions herein. Various types of gelatins are available and are in commercial production, and their use may change the preparation process somewhat. With the pre-softened gelatins, it is not necessary to add cold water to soften. Boiling water can be stirred in directly with the dry ingredients and the mixture thereafter cooled with ice water before refrigeration, the amount of water added within the ranges previously enumerated.

With the pre-softened gelatins, the amount of bromelain incorporated should be increased by about 50 percent to offset the weakening effect caused by the boiling water. If on the other hand, the bromelain is added during the final beating step, the amount can be reduced by about 50 percent of the normal requirement. That is, when the bromelain is mixed in during the final beating step, only about 0.75 to 2.5 milligrams per gram of gelatin is required to retard hardening. It has also been observed that the bromelain requirement increases as the compound ages due to gradual decomposition. Thus, if the bromelain has aged for a year or more, as much as twice the normal amount may be required.

Caloric content of the puddings of this invention may be further reduced by the use of artificial sweeteners. Any artificial sweetener may be used. For palatability, small amounts of sugar may be substituted for fractions of the sweetener. Substitution is less significant for the bittersweet chocolate pudding than for other varieties. If desired, sugar alone can be used as the sweetener though to do so will markedly increase the caloric content of the pudding.

The gelatin-bromelain pudding or gelatin-papain mixtures of this invention may also be modified to provide a product similar to instant puddings which are prepared using cold water only. Further, set times may be reduced significantly by the addition of a coagulating agent or gelatin accelerator, e.g. an alkali orthophosphate, to the pudding mix.

In offering these puddings commercially, the required amount of bromelain or papain may either be mixed directly with the other ingredients, or enclosed as a capsule in the pudding package with instructions to empty the contents of the capsule into the pudding during the final beating step. Where dried fruit is to be employed, the two major components can be separately packaged into one box. The first package would contain the dry powder for the pudding including the bromelain-lactose or papain-lactose mixture either admixed therein or contained in a separate capsule. The second package would contain the freeze-dried fruit bits and/or nectar crystals to be reconstituted and folded into the pudding after beating. Alternatively, a buffet size can (one cup) of fruit bits and nectar could be folded into the pudding as the final step in preparation. The freeze-dried fruit and nectar would be superior although factors related to production and/or economy may preclude its use.

As another feature of this invention, it has been found that by adding a measured amount of bromelain or papain to a standard gelatin dessert, a dessert of smoother and softer texture is obtained. These desserts have a greatly reduced tendency to harden, water, or crack upon refrigerated storage. They generally contain about seven grams of gelatin to which about 1 ¾ to 2 cups of water are added during preparation. About 1.5 to 5.0 milligrams of bromelain per gram of gelatin should be added to the dry powder gelatin mix before the addition of the water. If less than 1.5 milligrams of bromelain are added per gram of gelatin, texture will not be improved, and if more than 5.0 milligrams of bromelain are added to the mix, gelatin will be retarded, if not prevented. If papain is used, about four times as much will be required.

The following example is presented to illustrate the present invention, and not as a limitation thereof.

EXAMPLE

The following dry ingredients were thoroughly blended in a bowl:

artificial sweetener equivalent to 8 tbsp. sugar
6 tbsp. whole dry milk (packed firmly)
5 t. unflavored dry gelatin
2 tbsp. and 2 t. cocoa powder and ¾ t. instant coffee powder
1/16 t. salt
1 t. vanilla extract
45 mgs bromelain (1 ½ t. of a 1 percent bromelain- 99 percent lactose mixture)

To the blended dry ingredients ½ cup cold water was stirred in. The mix was then allowed to stand for three to five minutes to let the gelatin soften. Then 1 ½ cups of boiling water were added and the mixture beaten to dissolve the ingredients. The solution was cooled at room temperature for twenty minutes and then refrigerated for about three hours until completely firm. The bowl containing the gelled pudding mix was then removed from the refrigerator and a spatula run around the sides and bottom thereof so that the mixture was broken up by "criss-cross" cuts. The mixture was beaten with an electric or rotary beater at high speed two to three minutes. When throughly smooth, using the spatula to smooth out any large bubbles, the gelatin was spooned into four individual dishes and returned to the refrigerator to be rechilled. Two weeks later the pudding, stored under normal refrigeration, exhibited no evidence of stiffness, rubberiness or glassiness.

Having thus described my invention, other modifications will be readily apparent and within the scope of this invention which is to be limited only by the following claims.

What I claim is:

1. In a process for preparing a low calorie gelatin dessert containing a hardening retardent in an amount sufficient to regard gel hardening selected from the group consisting of bromelain and papain, the steps of:
   a. formulating a dry powder mix of ingredients including suitable amounts of gelatin, sweeteners, flavorings, and hardening retardent;
   b. adding sufficient boiling water to the powder mix to dissolve all the ingredients;
   c. allowing the solution to cool and form a gel; and thereafter
   d. whipping the gel until creamy.

2. The process of claim 1 including the step of adding a measured amount of cold water to the dry powder mix to soften the gelatin.

3. In a process for preparing a low calorie gelatin dessert containing a hardening retardent in an amount sufficient to retard gel hardening selected from the group consisting of bromelain and papain, the steps of:
 a. formulating a dry powder mix of ingredients including suitable amounts of gelatin, sweeteners and flavorings;
 b. adding sufficient boiling water to the powder mix to dissolve all ingredients;
 c. allowing the solution to cool and form a gel;
 d. adding the hardening retardent to the gel; and thereafter
 e. whipping the gel until smooth.

4. The process of claim 3 including the step of adding a measured amount of cold water to the dry power mix to soften the gelatin.

* * * * *